United States Patent
Ogawa

(10) Patent No.: US 10,404,912 B2
(45) Date of Patent: Sep. 3, 2019

(54) IMAGE CAPTURING APPARATUS, IMAGE PROCESSING APPARATUS, IMAGE CAPTURING SYSTEM, IMAGE PROCESSING METHOD, AND STORAGE MEDIUM

(71) Applicant: CANON KABUSHIKI KAISHA, Tokyo (JP)

(72) Inventor: Masato Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 14/948,711

(22) Filed: Nov. 23, 2015

(65) Prior Publication Data

US 2016/0156844 A1 Jun. 2, 2016

(30) Foreign Application Priority Data

Nov. 28, 2014 (JP) ................................ 2014-242456

(51) Int. Cl.
*H04N 5/232* (2006.01)
*G06T 3/40* (2006.01)

(52) U.S. Cl.
CPC ....... *H04N 5/23238* (2013.01); *G06T 3/4038* (2013.01); *H04N 5/232* (2013.01);
(Continued)

(58) Field of Classification Search
CPC .............................................. H04N 5/23238
(Continued)

(56) References Cited

U.S. PATENT DOCUMENTS

| 8,160,391 | B1 * | 4/2012 | Zhu ......................... G06T 5/005 345/629 |
| 2012/0306933 | A1 * | 12/2012 | Osako ..................... A63F 13/26 345/672 |
| 2014/0267594 | A1 * | 9/2014 | Furumura .......... H04N 5/23238 348/36 |

FOREIGN PATENT DOCUMENTS

| JP | 2003244511 A | | 8/2003 |
| JP | 2013198062 A | * | 9/2013 |
| JP | 2013198062 A | * | 9/2013 |

OTHER PUBLICATIONS

Antonio Criminisi, Patrick Pérez, and Kentaro Toyama; Region Filling and Object Removal by Exemplar-Based Image Inpainting; IEEE Transactions on Image Processing, vol. 13, No. 9, Sep. 2004.*

(Continued)

*Primary Examiner* — Anner N Holder
*Assistant Examiner* — Hesham K Abouzahra
(74) *Attorney, Agent, or Firm* — Canon U.S.A., Inc. IP Division

(57) ABSTRACT

An image processing apparatus configured to process captured images captured by an image capturing apparatus configured to simultaneously capture a plurality of images for generating a panoramic image or a generated image generated from the captured images includes a judgment unit configured to judge whether an image of a support member supporting the image capturing apparatus exists in a predetermined range in the captured images or the generated image, and a notification unit configured to notify, based on a result of the judgment by the judgment unit, a user of guidance information for changing a viewpoint position from which the image capturing apparatus captures images, wherein in a case where a feature amount indicating the support member is detected in a predetermined region in the captured images or the generated image, the judgment (Continued)

unit judges that an image of the support member exits in the predetermined range.

24 Claims, 18 Drawing Sheets

(52) U.S. Cl.
CPC ..... *H04N 5/23222* (2013.01); *H04N 5/23293* (2013.01); *G06T 2200/32* (2013.01)

(58) Field of Classification Search
USPC .......................................................... 348/36
See application file for complete search history.

(56) References Cited

OTHER PUBLICATIONS

A. Criminisi, P. Perez and K. Toyama, "Region filling and object removal by exemplar-based image inpainting," in IEEE Transactions on Image Processing, vol. 13, No. 9, pp. 1200-1212, Sep. 2004.doi: 10.1109/TIP.2004.833105 (Year: 2004).*

* cited by examiner

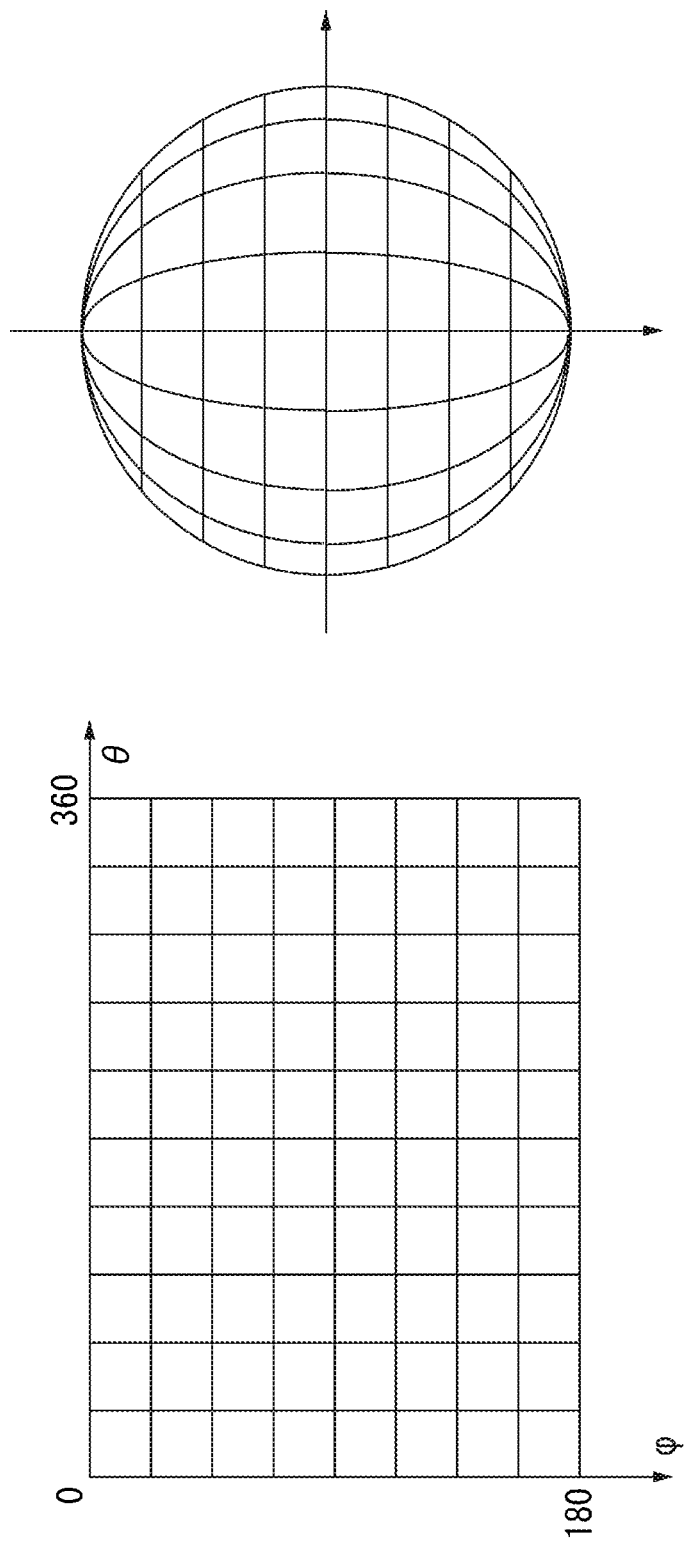

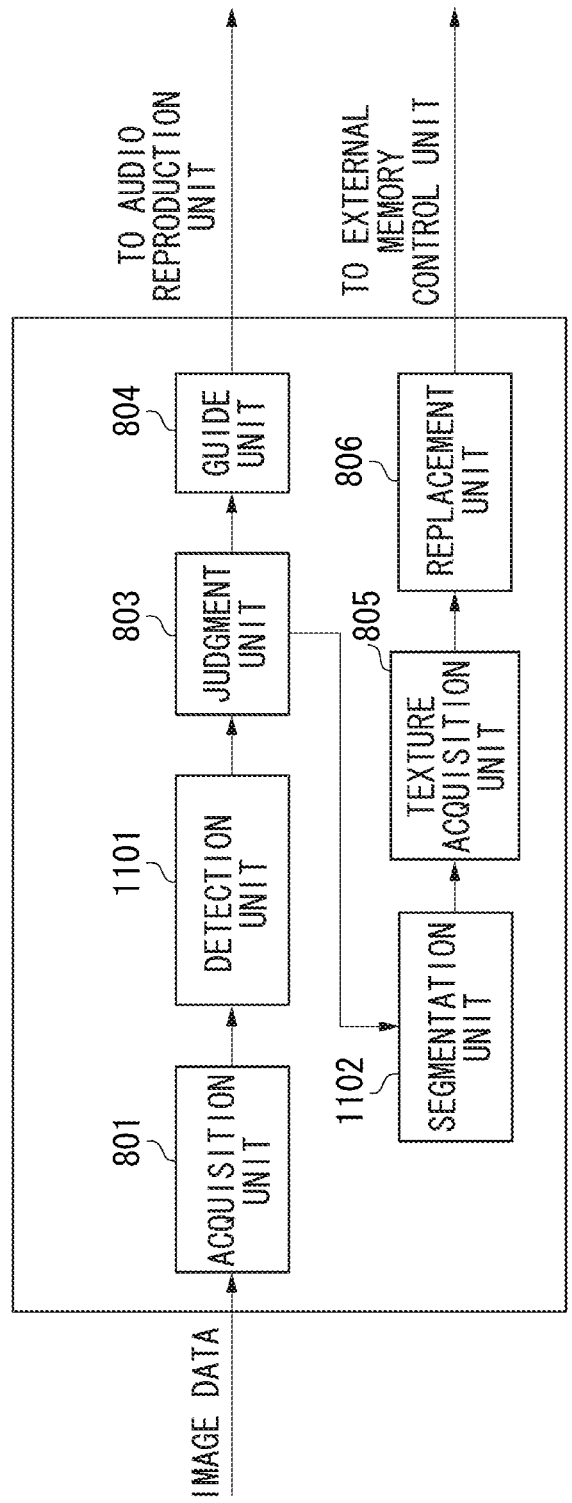

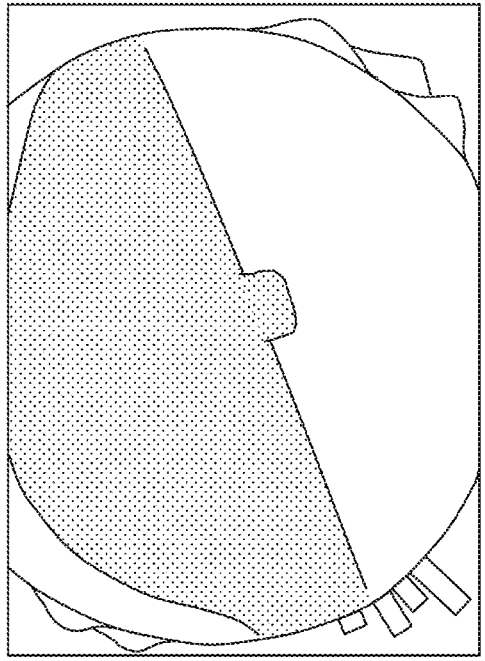
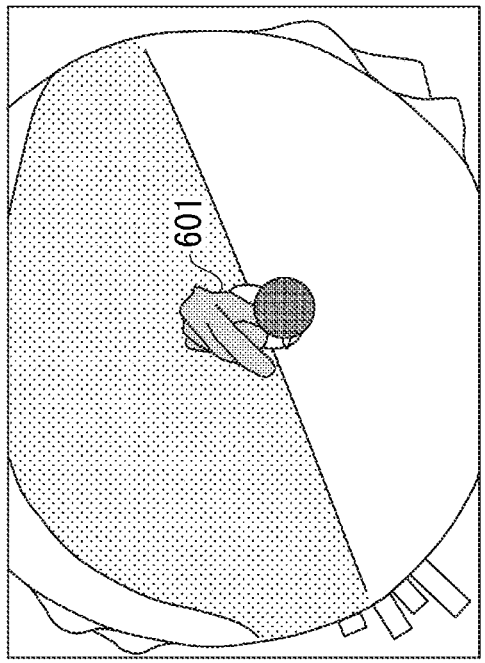

IMAGE CAPTURING APPARATUS, IMAGE PROCESSING APPARATUS, IMAGE CAPTURING SYSTEM, IMAGE PROCESSING METHOD, AND STORAGE MEDIUM

BACKGROUND OF THE INVENTION

Field of the Invention

The present invention relates to image processing for generating a panoramic image.

Description of the Related Art

A panoramic (omnidirectional, i.e., full angle of view) image capturing apparatus is an image capturing apparatus configured to capture a 360-degree panoramic image around the image capturing apparatus being the center with as small blind spot as possible. In recent years, it has become popular to post panoramic images captured by such a panoramic image capturing apparatus to an unspecified number of people through a social networking service on the Internet. When an image is posted to an unspecified number of people, it is desirable to take privacy measures as necessary so that the image does not include information from which an individual may be identifiable. However, due to the characteristic that a panoramic image capturing apparatus has substantially no blind spot, a panoramic image captured by the panoramic image capturing apparatus includes an image of a photographer. Japanese Patent Application Laid-Open No. 2003-244511 discusses that in a case of using an all-direction camera configured to capture a 360-degree image excluding the top and bottom of an image capturing apparatus, the photographer holds the image capturing apparatus above the head of the photographer while capturing an image so that the image does not include an image of the photographer. Further, Japanese Patent Application Laid-Open No. 2013-198062 discusses an image processing apparatus configured to detect an image of a photographer from a panoramic image and to perform hiding processing such as filling, blurring, etc. on the detected image of the photographer.

However, in the case of capturing a panoramic image including an image of a vertical direction, even if a photographer holds an image capturing apparatus above the head of the photographer while capturing an image as discussed in Japanese Patent Application Laid-Open No. 2003-244511, the image includes an image of the photographer. Further, in the case of using the technique discussed in Japanese Patent Application Laid-Open No. 2013-198062, although who the photographer is can be made unidentifiable, there arises a problem that an image of the photographer becomes an obstacle especially when the photographer desires to capture an image of a landscape, etc. as a main object, since the image of the photographer remains.

SUMMARY OF THE INVENTION

The present invention is directed to assisting in capture of an image suitable for eliminating an image of a photographer included in an image.

According to an aspect of the present invention, an image processing apparatus configured to process captured images captured by an image capturing apparatus configured to simultaneously capture a plurality of images for generating a panoramic image or a generated image generated from the captured images includes a judgment unit configured to judge whether an image of a support member supporting the image capturing apparatus exists in a predetermined range in the captured images or the generated image, and a notification unit configured to notify, based on a result of the judgment by the judgment unit, a user of guidance information for changing a viewpoint position from which the image capturing apparatus captures images, wherein in a case where a feature amount indicating the support member is detected in a predetermined region in the captured images or the generated image, the judgment unit judges that an image of the support member exits in the predetermined range.

Further features of the present invention will become apparent from the following description of exemplary embodiments with reference to the attached drawings.

BRIEF DESCRIPTION OF THE DRAWINGS

FIGS. 5A and 5B illustrate forms of a panoramic image.

FIG. 11 is a block diagram illustrating a configuration of an image processing unit according to a second exemplary embodiment.

FIGS. 14A and 14B illustrate a technical problem to be solved by a third exemplary embodiment.

DESCRIPTION OF THE EMBODIMENTS

In a first exemplary embodiment, a technique for eliminating an image of a photographer from a panoramic image and a technique for assisting a user in capturing a panoramic image suitable for eliminating an image of the photographer.

Figure 1:
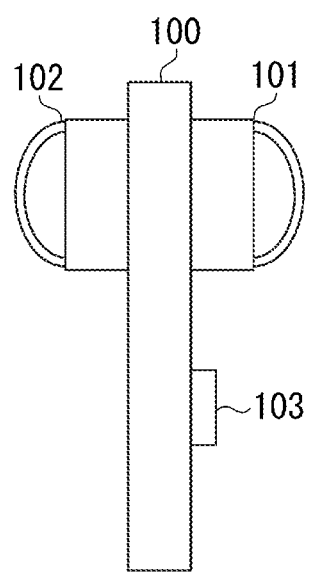
FIG. 1 illustrates an example of an exterior of a panoramic image capturing apparatus.

FIG. 1 illustrates an example of an exterior of a panoramic image capturing apparatus according to the present exemplary embodiment. An image capturing apparatus 100 is equipped with fisheye lenses each having a field of view of 180 degrees or more, and includes image capturing units 101 and 102 configured to acquire color image data and an image-capturing button 103 for executing an image capture instruction. At the press of the image-capturing button 103 by a user, the image capturing units 101 and 102 receive at a sensor (an image sensor) optical information about an object, and the received signals undergo analog/digital (A/D) conversion so that two captured images are simultaneously acquired. The two captured images are combined together to generate a panoramic image. While the image capturing apparatus including the two image capturing units is used in the present exemplary embodiment, the configuration of the image capturing apparatus is not limited to the foregoing configuration and may be any configuration by which a panoramic image can be acquired. For example, the present exemplary embodiment is also applicable to a camera equipped with three or more wide-angle lenses that are not fisheye lenses.

Figure 2:
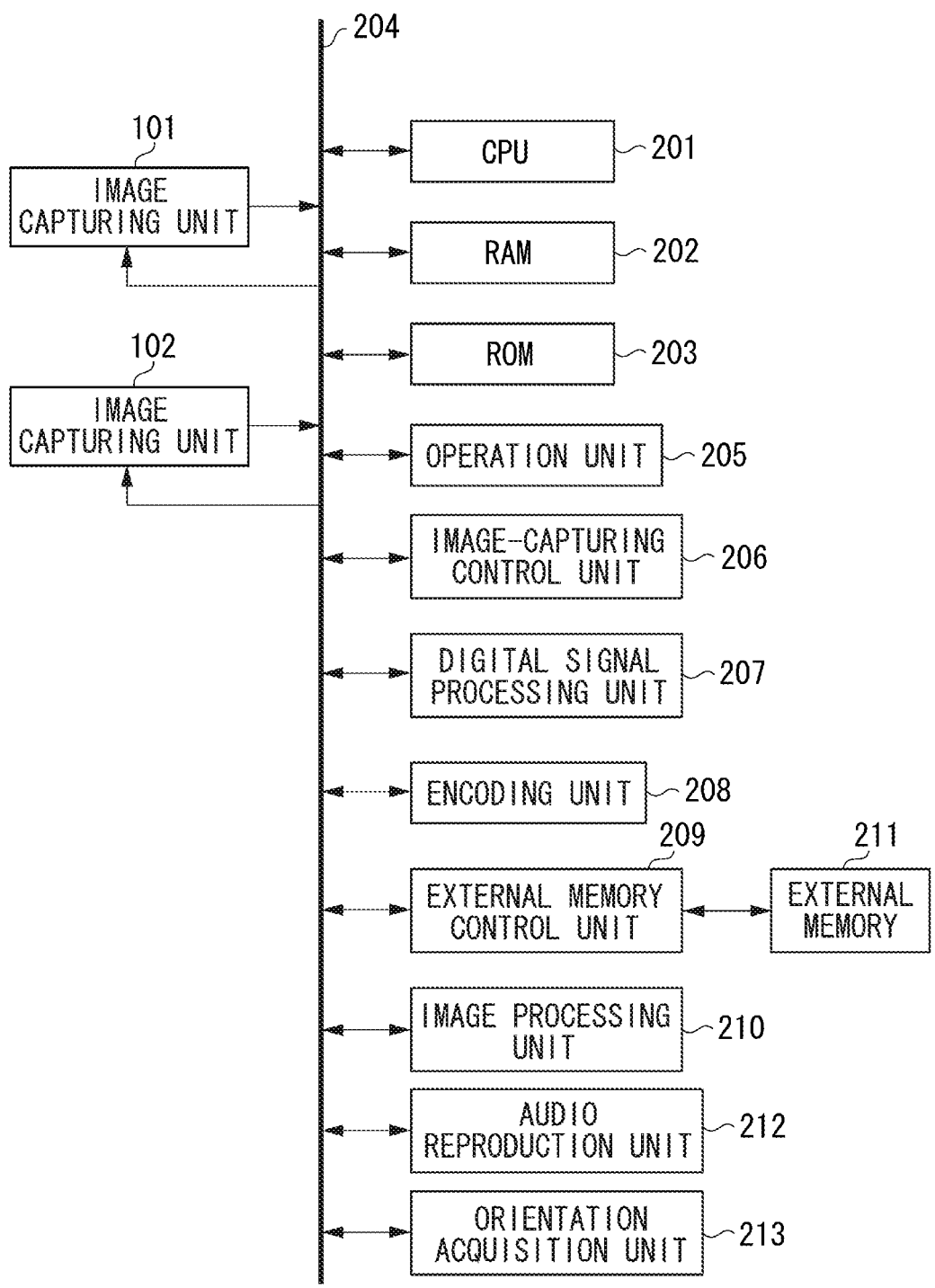
FIG. 2 is a block diagram illustrating an internal configuration of an image capturing apparatus according to a first exemplary embodiment.

FIG. 2 is a block diagram illustrating an internal configuration of the image capturing apparatus 100. A central processing unit (CPU) 201 is a processing circuit configured to comprehensively control each unit described below. A random access memory (RAM) 202 is a memory configured to function as a main memory, and a work area of the CPU 201. A read-only memory (ROM) 203 is a memory configured to store control programs to be executed by the CPU 201.

A bus 204 is a path for the transfer of various types of data, and the components of the image capturing apparatus 100 are connected to one another by the bus 204. For example, image data acquired by the image capturing units 101 and 102 is transmitted to a predetermined processing unit via the bus 204. An operation unit 205 is an interface such as a button, a dial, etc. for receiving user instructions. The image-capturing button 103 is included in the operation unit 205, and the user operates the image-capturing button 103 to input an instruction to capture an image by the capturing units 101 and 102. An image-capturing control unit 206 is a processing circuit configured to control the image capturing units 101 and 102 based on an instruction from the CPU 201. An image capture instruction input from the operation unit 205 is first transmitted to the CPU 201, and then transmitted from the CPU 201 to the image-capturing control unit 206. A digital signal processing unit 207 is a processing circuit configured to perform various types of processing such as white balance processing, gamma processing, noise reduction processing, etc. on image data received via the bus 204.

An encoding unit 208 is a processing circuit configured to perform processing to convert captured image data into a file format such as a Joint Photographic Experts Group (JPEG) format. An external memory control unit 209 is an interface for connecting the image capturing apparatus 100 to an external memory 211 (e.g., a storage medium such as a personal computer, a hard disk, a memory card, a Compact-Flash (CF) card, a Secure Digital (SD) card, a Universal Serial Bus (USB) memory, etc.). An image processing unit 210 performs image processing such as image synthesis, etc. by use of captured images acquired by the image capturing units 101 and 102 or captured images output from the digital signal processing unit 207. The image processing unit 210 also performs processing to generate a panoramic image and processing to eliminate an image of the photographer. An audio reproduction unit 212 is a speaker configured to reproduce audio for notifying the user of guidance information for correcting a position from which the image capturing apparatus 100 captures images. An orientation acquisition unit 213 acquires orientation information about the orientation of the camera by use of a gyro sensor, etc. The acquired orientation information is used to correct the direction of a panoramic image when the image processing unit 210 is generating the panoramic image. The image capturing apparatus also includes other components, but description of the other components is omitted because they are not a feature of the present exemplary embodiment.

Figure 3:
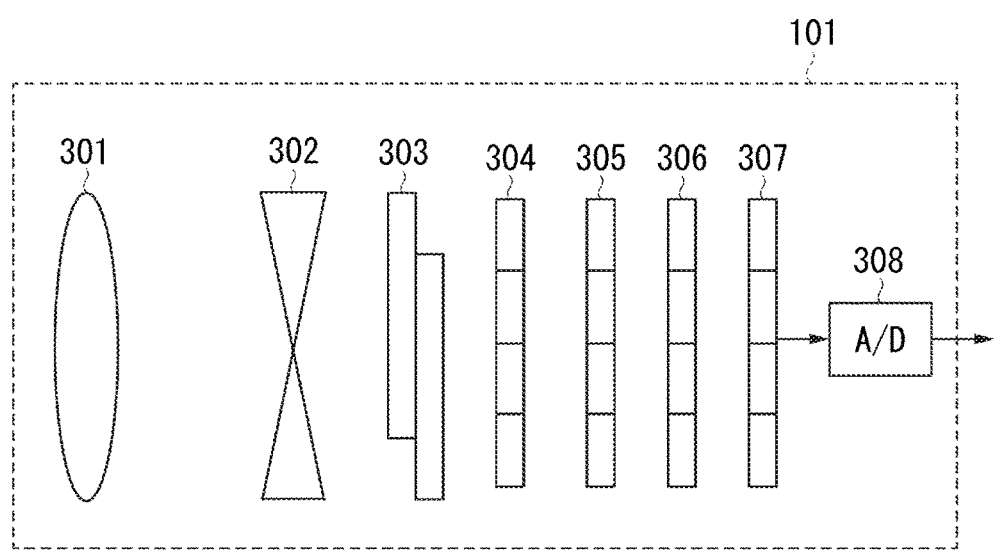
FIG. 3 illustrates an internal configuration of an image capturing unit.

FIG. 3 illustrates an internal configuration of the image capturing unit 101. The image capturing unit 101 includes a fisheye lens 301, a diaphragm 302, a shutter 303, an optical low-pass filter 304, an infrared (IR) cut filter 305, a color filter 306, a sensor 307, and an A/D conversion unit 308. The sensor 307 is, for example, an image sensor such as a complementary metal oxide semiconductor (CMOS), a charge-coupled device (CCD), etc., and detects an amount of light of an object focused by the fisheye lens 301. The detected amount of light is output as an analog value from the sensor 307, converted into a digital value by the A/D conversion unit 308, and output as digital data to the bus 204. The configuration of the image capturing unit 102 is similar to that of the image capturing unit 101, so description of the configuration of the image capturing unit 102 is omitted.

Figure 4A:
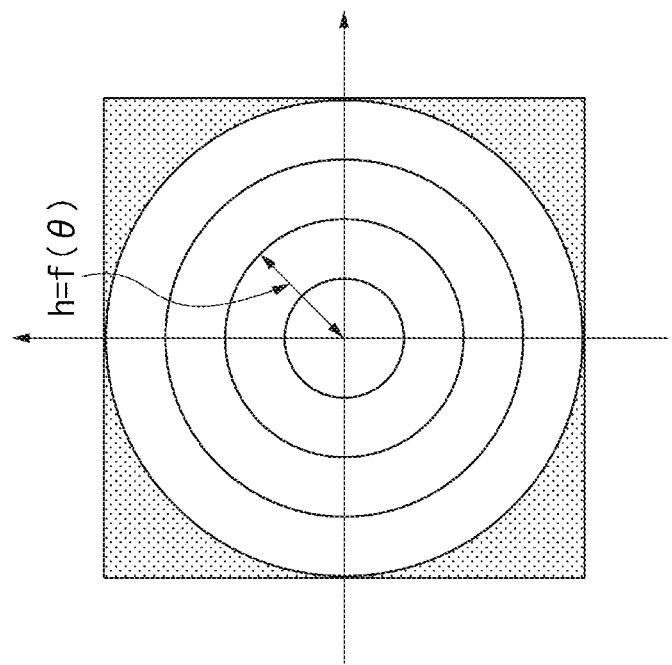
FIGS. 4A and 4B illustrate a projection relationship of a fisheye lens.
Figure 4B:
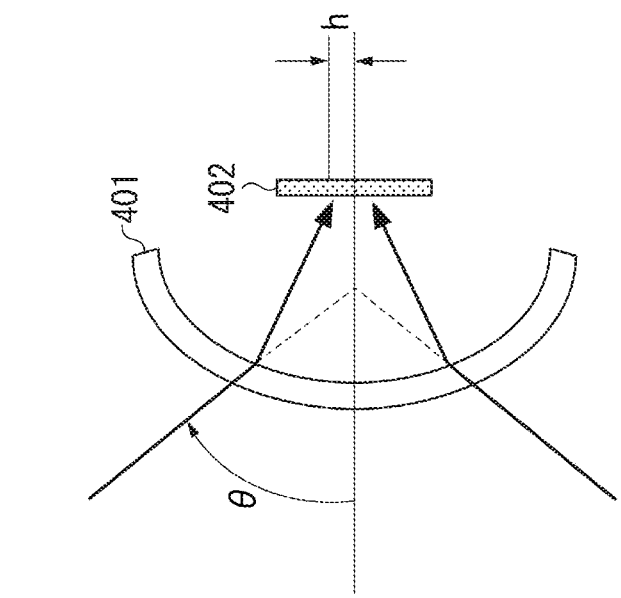

The following describes a panoramic image. FIGS. 4A and 4B illustrate a projection relationship of a fisheye lens having an angle of view of 180 degrees or more. FIG. 4A illustrates how light enters a fisheye lens 401 at an incidence angle $\theta$, and FIG. 4B illustrates where on a sensor 402 the light forms an image. The incidence angle $\theta$ and an image height h have a relationship represented by the following formula:

$$h = f(\theta),$$

where $f(\theta)$ is a projection function, and the projection function varies depending on properties of the fisheye lens.

FIGS. 5A and 5B illustrate forms of a panoramic image. A panoramic image is an image in which each pixel is associated with an incidence angle of light corresponding to the pixel. In a case where a panoramic image is developed into a two-dimensional plane, an image as illustrated in FIG. 5A is obtained in which a horizontal angle $\theta$ of 0 to 360 degrees and a vertical angle $\varphi$ of 0 to 180 degrees correspond to each pixel. Angle coordinates are associated with respective points on a spherical surface. Thus, when a panoramic image is shown in a three-dimensional space, the angle coordinates are similar to latitude/longitude coordinates on a globe illustrated in FIG. 5B.

Figure 6A:
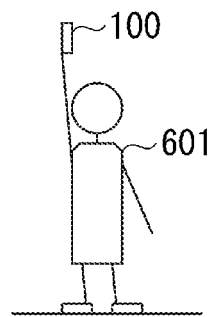
FIGS. 6A, 6B, and 6C illustrate an example of a panoramic image.
Figure 6B:
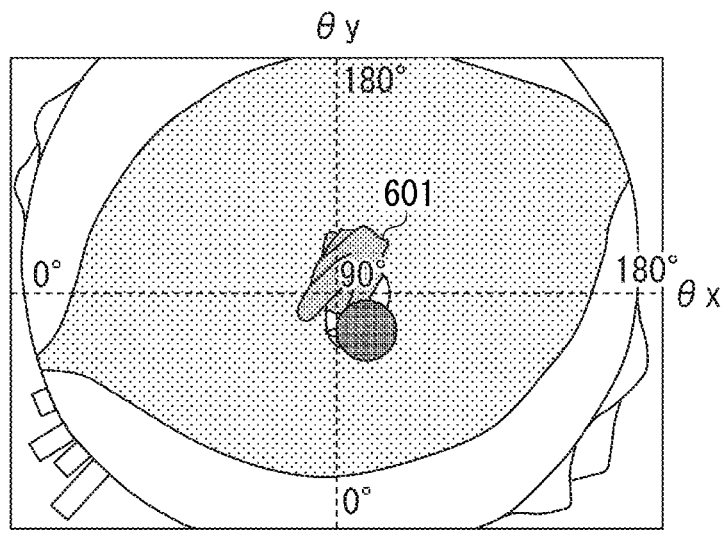

Each pixel in captured images input from the image capturing units 101 and 102 can be associated with an angle coordinate in a panoramic image by use of the projection function illustrated in FIGS. 4A and 4B. Then, the two input captured images are projected onto the same angle plane based on the relationship represented by the projection function, whereby a unified panoramic image can be generated. An example of a panoramic image used in the present exemplary embodiment is illustrated in FIG. 6B. FIG. 6B illustrates a part of a panoramic image generated from images captured by a photographer 601 holding the image capturing apparatus 100 above the head of the photographer 601 as illustrated in FIG. 6A. FIG. 6B illustrates an image obtained by projecting a region of a panoramic image generated in the present exemplary embodiment in the range of $90° \leq \varphi \leq 180°$, i.e., a region corresponding to an area below the image capturing apparatus 100, onto a new angle plane defined by angles $\theta x$ and $\theta y$. The angle $\theta x$ is a value that specifies an angle formed by an x-axis and a line segment formed between a point on the spherical surface illustrated in FIG. 5B and the central point of the spherical surface that is the viewpoint of the image capturing, where the x-axis is an optical axis direction of the image capturing units 101 and 102. Further, the angle θy is a value that specifies an angle formed by a y-axis and a line segment formed by a point on the spherical surface illustrated in FIG. 5B and the central point of the spherical surface, where the y-axis is an axis that is orthogonal to the x-axis on the horizontal plane.

Figure 6C:
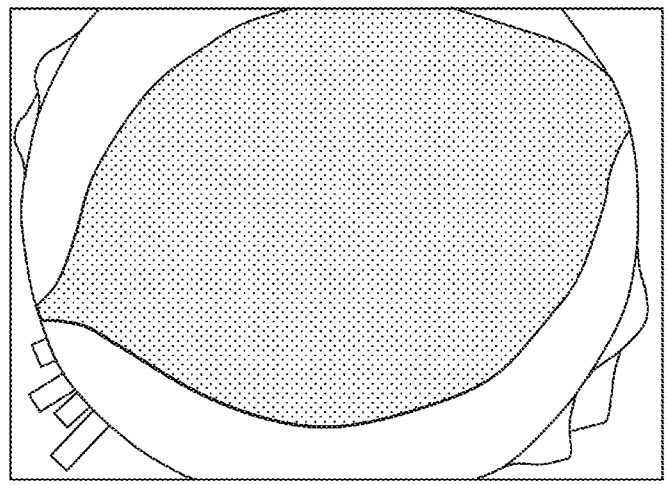
Figure 7A:
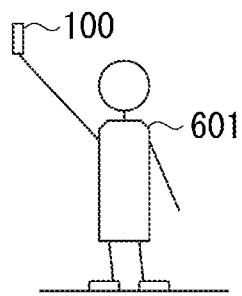
FIGS. 7A, 7B, and 7C illustrate an example of a panoramic image.
Figure 7B:
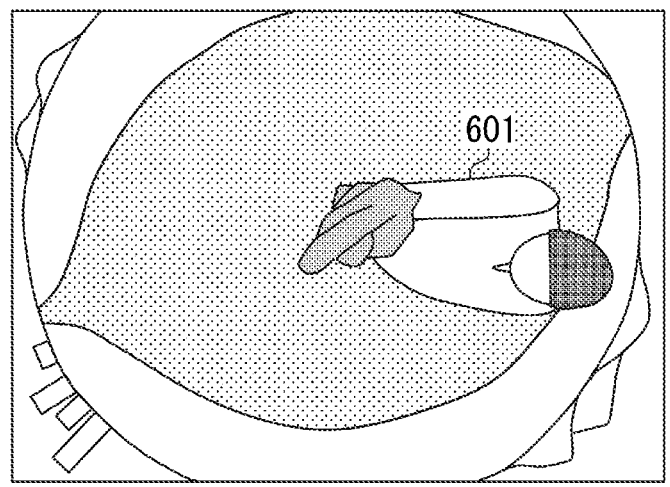
Figure 7C:
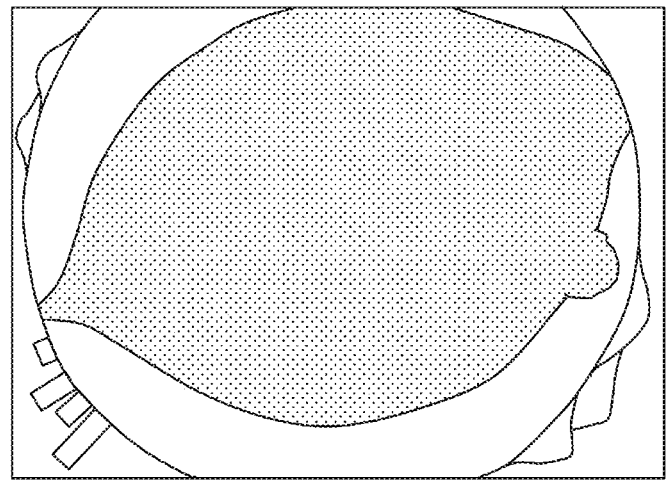

An image that exists at the center in FIG. 6B is an image of the photographer 601, and a gray region existing around the image of the photographer 601 is a region corresponding to the ground. The image processing unit 210 according to the present exemplary embodiment overwrites the region corresponding to the image of the photographer with a texture corresponding to the ground, thereby eliminating the image of the photographer as illustrated in FIG. 6C. Depending on the image-capturing position of the image capturing apparatus 100 during the image capturing, the image of the photographer may not be eliminated as illustrated in FIG. 6C. For example, in a case where the photographer 601 anteriorly holds the image capturing apparatus 100 as illustrated in FIG. 7A when capturing an image, a panoramic image as illustrated in FIG. 7B is generated. In this case, the image of the photographer 601 is not surrounded by a single type of a ground region and extends beyond a boundary of the ground region. Therefore, if the processing is performed to fill the region of the photographer with the texture of the ground, the shape of the ground region is changed as illustrated in FIG. 7C. Thus, the image capturing apparatus 100 according to the present exemplary embodiment performs processing to notify the user of guidance information for changing a viewpoint position from which the image capturing apparatus 100 captures images so that the user can acquire images suitable for eliminating an image of the photographer as illustrated in FIG. 6C.

Figure 8:
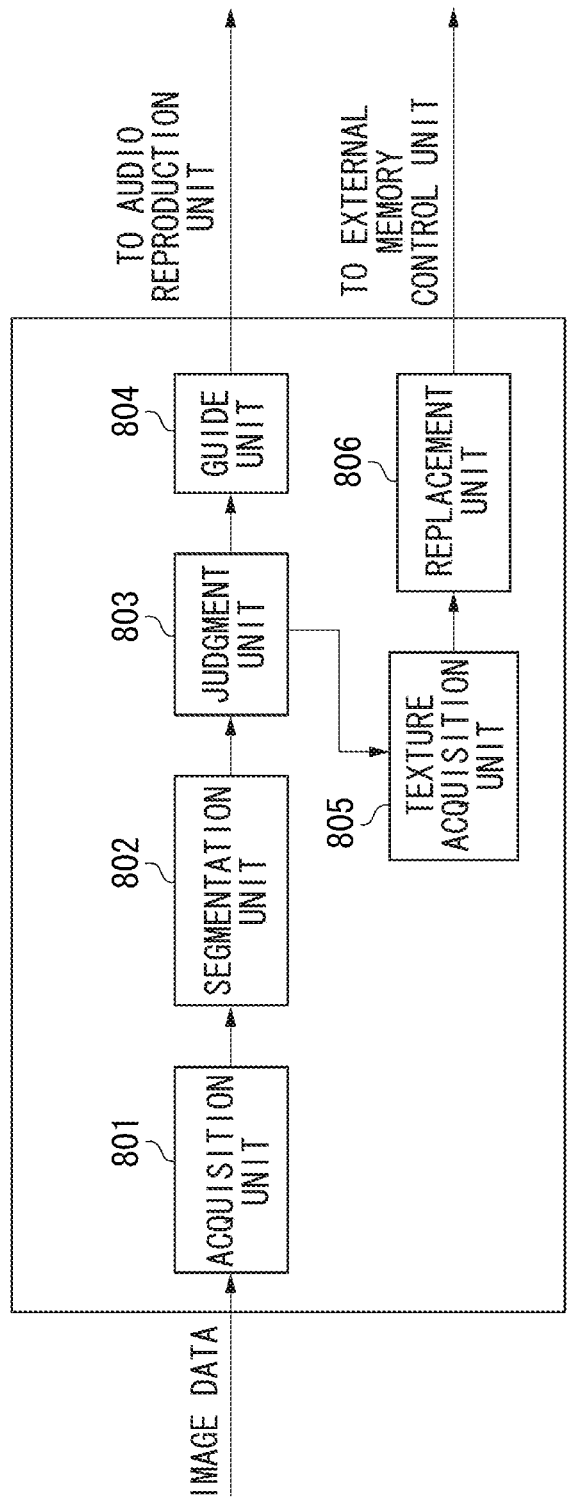
FIG. 8 is a block diagram illustrating a configuration of an image processing unit according to the first exemplary embodiment.
Figure 9:
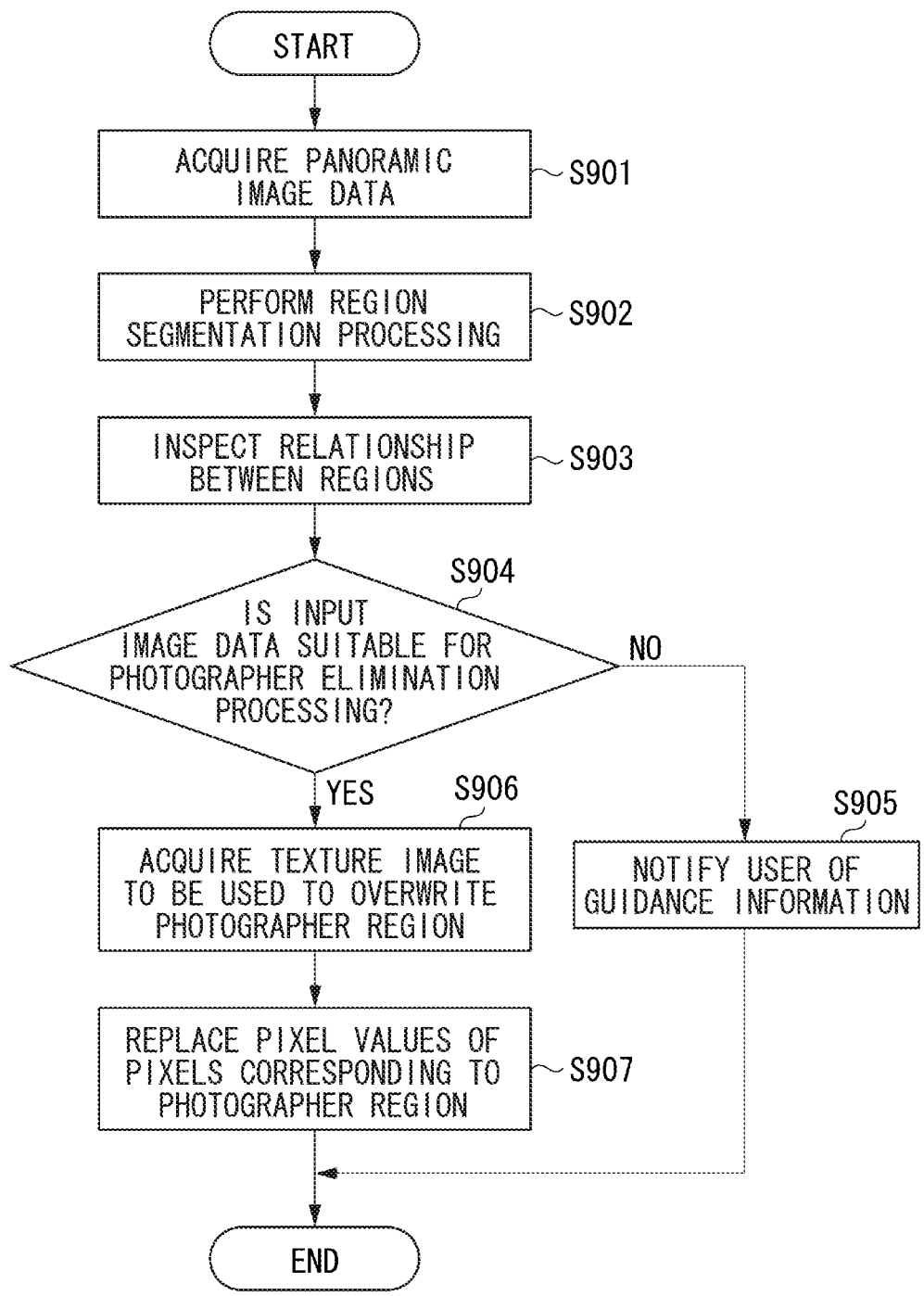
FIG. 9 is a flowchart illustrating a process to be performed by the image processing unit according to the first exemplary embodiment.

The following describes the processing performed by the image processing unit 210 according to the present exemplary embodiment, with reference to FIGS. 8 and 9. FIG. 8 is a block diagram illustrating a functional configuration of the image processing unit 210. The CPU 201 executes a program stored in the ROM 203 to control the image processing unit 210 as respective blocks illustrated in FIG. 6, whereby the image capturing apparatus 100 executes processing illustrated in the flowchart in FIG. 9. Not the entire processing described below has to be executed by the image processing unit 210, and the image capturing apparatus 100 may be configured such that one or multiple processing circuits other than the image processing unit 210 execute a part of or the entire processing.

In step S901, an acquisition unit 801 acquires panoramic image data to be processed. In the present exemplary embodiment, a panoramic image acquisition method is used in which a panoramic image is generated from two captured images input from the image capturing units 101 and 102 by use of a method described above. An exemplary embodiment of the present invention is also applicable to a case where image data unified in advance as a panoramic image is acquired from the ROM 203 or the external memory 211. The acquisition unit 801 outputs the acquired panoramic image data to a segmentation unit 802.

In step S902, the segmentation unit 802 performs region segmentation processing on the panoramic image data input from the acquisition unit 801. Specifically, in the panoramic image data, a region corresponding to the ground (a ground region) and a region corresponding to the photographer (a photographer region) are respectively determined, and region segmented data in which each pixel is labeled with the corresponding region is output to a judgment unit 803. The region segmented data may be image data in which a difference in corresponding regions is specified by a difference in pixel values or a table storing positions of pixels corresponding to respective regions.

The following describes the processing performed in step S902. First, the segmentation unit 802 segments the panoramic image into a plurality of small blocks, and extracts an image block having a periodic pattern. In a case where the ground is gravel, soil, bricks, asphalt, marble, carpet, or the like that enables the image of the photographer to be eliminated by the processing according to the present exemplary embodiment, a region corresponding to the ground is a texture image having a periodic pattern. Thus, the segmentation unit 802 extracts an image block having a periodic pattern to extract a candidate region of a ground region. Various methods can be used to detect an image block having a periodic pattern, and examples include a method using a density histogram, a method using a difference statistic in an image, etc. In the present exemplary embodiment, a periodic pattern is detected based on two-dimensional Fourier transformation of each image block. The following describes the method of detecting a periodic pattern according to the present exemplary embodiment.

There are a periodic pattern in which the direction of the periodic pattern is distinct, such as bricks, cloth, wood grain, etc., and a periodic pattern in which the direction of the periodic direction is not distinct but the size of a pattern that appears is substantially equal, such as soil, gravel, etc. The segmentation unit 802 detects as an image block having a periodic pattern an image block corresponding to at least one of the two types of periodic patterns described above based on the size of a power spectrum of a two-dimensional Fourier transformation $F(u, v)$ of each image block $I(u, v)$.

Specifically, in a method of detecting the former periodic pattern, the segmentation unit 802 inspects for each angle θ a mean value of power spectrums of points existing on a straight line crossing the origin at an angle $\theta(0° \leq \theta \leq 180°)$ in $F(u, v)$. If there exists an angle θ that the ratio of the mean value to a mean value of the power spectrums of the entire $F(u, v)$ is higher than a predetermined threshold value, the image block is detected as an image block having a periodic pattern. To take into consideration a case where the directions of periodic patterns vary to some extent, the angle θ for calculating the mean value may have a predetermined range.

Further, in a method of detecting the latter periodic pattern, the segmentation unit 802 inspects for each value d a mean value of power spectrums of points having a distance r from the origin that is within the range specified by $d-w \leq r \leq d+w$ (d and w being arbitrary positive values) in $F(u, v)$. If there exists a value d that the ratio of the mean value to the mean value of power spectrums of the entire $F(u, v)$ is higher than a predetermined threshold value, the image block is detected as an image block having a periodic pattern. The value w used herein may be adjusted as appropriate according to an intended scene. For example, in a case of a scene where the size of a pattern in an image varies significantly, the value w is desirably large.

The foregoing describes the processing performed to detect an image block having a periodic pattern according to the present exemplary embodiment. After image blocks each having a periodic pattern are extracted, the segmentation unit 802 performs clustering on the extracted image blocks based on an average luminance of each of the image blocks. Specifically, peaks in a density histogram of pixels of the entire extracted image blocks are detected, and k-means clustering is performed on the image blocks each having a periodic pattern by use of the multiple detected peak values as an initial solution. In this way, the extracted image blocks each having a periodic pattern is classified into a region corresponding to the same type of texture so that ground regions of different types can be distinguished. At this time, the segmentation unit 802 determines as a block corresponding to an object that is not a ground an image block corresponding to a cluster that the number of classified blocks is smaller than a predetermined threshold value, and the segmentation unit 802 excludes such image block from the candidates of the ground region. Then, the respective image blocks that have not been excluded are labeled as ground region 1, ground region 2, etc. for each corresponding cluster.

The following describes the determination of a photographer region. Candidates of the photographer region are the regions that have not been extracted as a ground region in the processing described above. A hand of the photographer is included in the central part of an image that is a region immediately below the image capturing apparatus. Accordingly, the central part of the image is logically a photographer region. Thus, the segmentation unit 802 sets the closest non-ground region to the central part of the image as a photographer region. Further, if a non-ground region is adjacent to the region set as the photographer region, the non-ground region is also added to the photographer region to expand the photographer region. If there is no more adjacent non-ground region, the segmentation unit 802 ends the expansion of the photographer region and labels a corresponding image region as the photographer region. Image regions determined as neither the photographer region nor the ground region are labeled as other regions by the segmentation unit 802, and the segmentation unit 802 generates region segmented data, in which a corresponding region is specified for all the pixels, and outputs the region segmented data to the judgment unit 803. A method other than that described above may be used as a region segmentation method. For example, a publicly-known method such as a region unification method may be used.

Figure 10B:
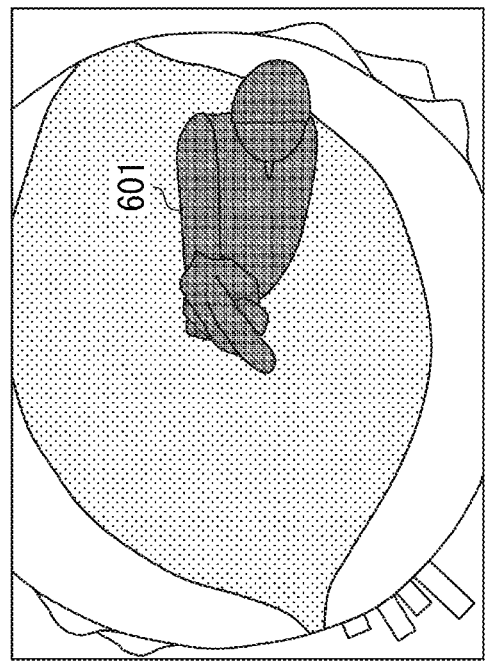
FIGS. 10A and 10B illustrate an example of region segmented data.
Figure 10A:
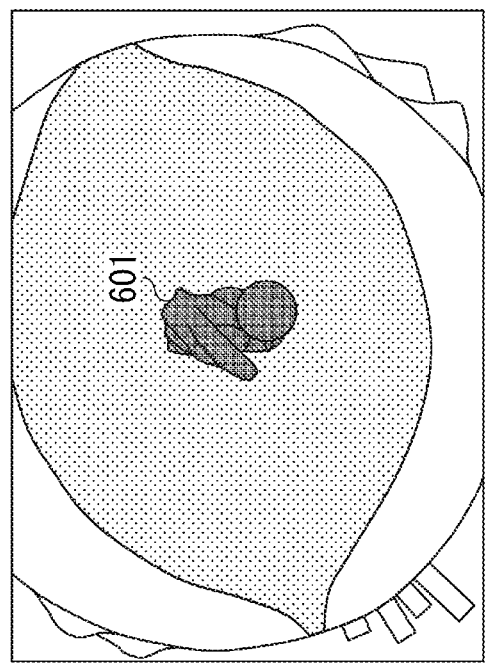

In step S903, the judgment unit 803 inspects a relationship between the ground region and the photographer region based on a result of the region segmentation performed by the segmentation unit 802. FIGS. 10A and 10B illustrate a result of the region segmentation performed in step S902. FIG. 10A illustrates a region segmented image corresponding to FIG. 6B, and FIG. 10B illustrates a region-segmented image corresponding to FIG. 7B. Different colors of regions indicate that the regions are judged as different regions. A black region corresponds to the photographer region, and a gray region corresponds to the ground region. In the present exemplary embodiment, the judgment unit 803 judges whether the photographer region is surrounded by the same ground region. While various methods may be used as a method for the judgment, in the present exemplary embodiment, the judgment unit 803 performs edge extraction processing on a region segmented image input from the segmentation unit 802, and then inspects a region corresponding to a pixel adjacent to a pixel extracted as an edge part of the photographer region. Specifically, regions adjacent to the pixels extracted as the edge part of the photographer region (adjacent regions) are counted for each type of the regions.

In step S904, the judgment unit 803 judges whether the input image data is image data suitable for photographer elimination processing based on a result of the inspection performed in step S903. In the present exemplary embodiment, the judgment unit 803 performs the judgment based on whether the ratio of frequency of detection of other regions detected as an adjacent region with respect to a region with the highest detection frequency among the regions detected as an adjacent region is higher than a predetermined threshold value. Specifically, if the ratio is higher than the predetermined threshold value, it means that the photographer region is adjacent to two or more different types of regions and thus the acquired panoramic image is not suitable for the photographer elimination. If the judgment unit 803 judges that the photographer region is adjacent to two or more different types of regions and thus the panoramic image is not suitable for the photographer elimination (NO in step S904), the processing proceeds to step S905. On the other hand, if the judgment unit 803 judges that the photographer region is not adjacent to two or more different types of regions and thus the panoramic image is suitable for the photographer elimination (YES in step S904), the processing proceeds to step S906.

In step S905, a guide unit 804 outputs to the audio reproduction unit 212 information for notifying the user of guidance information for changing the position of the image capturing apparatus 100, and the processing ends. While the guidance information may be in various forms, in the present exemplary embodiment, guidance audio such as "Please hold the camera higher and shoot" is transmitted to the user by the audio reproduction unit 212 to notify the user of the guidance information.

In step S906, a texture acquisition unit 805 acquires a texture image to be used to overwrite the photographer region. As a texture image to be used to overwrite the photographer region, an image of an image block existing at the closest position to the central part of the image in the ground region adjacent to the photographer region is acquired, because a distortion in texture is smaller at smaller distances from the central part of the image. Then, the texture acquisition unit 805 outputs the acquired texture image to a replacement unit 806. A method for the acquisition of a texture image is not limited to the foregoing method, and an image block may be extracted randomly from the ground region adjacent to the photographer region. Further, a database of texture images corresponding to different types of grounds may be stored in advance in the ROM 203, and a texture image with the closest luminance value to the luminance value of the ground region adjacent to the photographer region may be used. Furthermore, the values θ and d corresponding to a periodic pattern of each image block may be stored in advance at the time of the processing performed in step S902, and the image block having the closest values θ and d to the mean values of all the image blocks corresponding to the same ground region may be used.

In step S907, the replacement unit 806 arranges the texture images input from the texture acquisition unit 805 on the photographer region, thereby replacing the pixel values of the pixels corresponding to the photographer region.

The foregoing describes the processing performed by the image capturing apparatus 100 according to the present exemplary embodiment. By the foregoing processing, in a case where the acquired panoramic image is an image that is not suitable for the photographer elimination, it is possible to prompt the user to change the position of the image capturing apparatus so that the user can acquire a panoramic image suitable for the photographer elimination. Further, in a case where the acquired panoramic image is an image suitable for the photographer elimination, a panoramic image from which the image of the photographer has been naturally eliminated can be generated. An image to be processed in the present exemplary embodiment does not need to be a unified panoramic image, and any image from which the position of the image of the photographer can be identified can be used such as a part of a panoramic image or a captured image captured by the image capturing.

An image that can be eliminated by the processing according to the present exemplary embodiment is not limited to an image of a person capturing images, and any image of a support member supporting the image capturing apparatus 100 can be eliminated. For example, in a case where the image capturing apparatus 100 is supported by a robot arm that can be driven, the processing can be used to eliminate an image of the robot arm. In this case, the region referred to as the photographer region in the above exemplary embodiment can directly be referred to as a support member region.

In the present exemplary embodiment, the image capturing apparatus 100 functions as an image capturing apparatus configured to simultaneously capture a plurality of images for generating a panoramic image. In the present exemplary embodiment, the judgment unit 803 functions as a judgment unit configured to judge whether an image of a support member supporting the image capturing apparatus exists in a predetermined range in images captured by the image capturing apparatus or a generated image generated from the captured images. Further, the audio reproduction unit 212 functions as a notification unit configured to notify, based on a result of the judgment by the judgment unit, a user of guidance information for changing a viewpoint position from which the image capturing apparatus captures images. Furthermore, the segmentation unit 802 functions as a region determination unit configured to determine a support member region corresponding to the support member and a ground region corresponding to a ground in the captured images or the generated image.

In the first exemplary embodiment, the region segmentation processing is performed on an acquired panoramic image, and whether the panoramic image is suitable for the photographer elimination is judged based on whether the photographer region is surrounded by the same ground region. In a second exemplary embodiment, an example will be described in which whether a panoramic image is suitable for the photographer elimination is judged by an easier method than the method according to the first exemplary embodiment.

Figure 13:
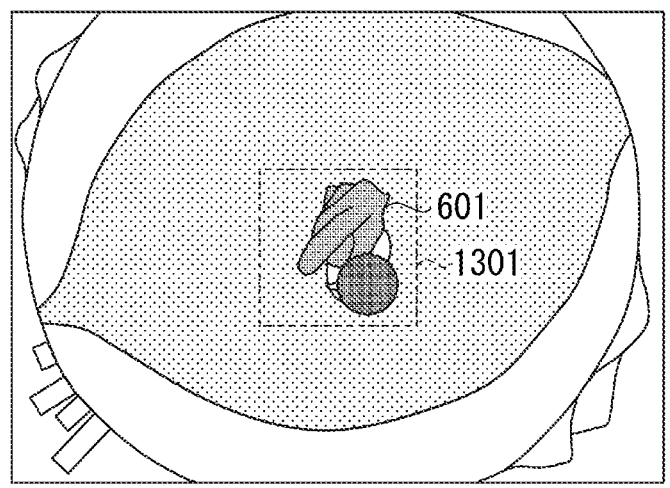
FIG. 13 illustrates a head part detection range.

The following schematically describes processing to be performed by the image processing unit 210 according to the present exemplary embodiment, with reference to FIG. 13. The image processing unit 210 according to the present exemplary embodiment judges whether an image is suitable for the photographer elimination not by detecting a photographer region and a ground region in the image but based on whether a head part of the photographer is within a predetermined range in a central part of the image. This is based on the logic that if the head part of the photographer is within the predetermined range in the central part of the image, this indicates that the photographer is holding the image capturing apparatus 100 high above the head of the photographer while capturing images, and in this case, the image of the photographer is less likely to be adjacent to two or more different regions. Thus, in a case where the head part of the photographer is within the predetermined rage in the central part of the image, the image capturing apparatus 100 according to the present exemplary embodiment judges that its panoramic image is suitable for the photographer elimination processing. In this way, whether to generate guidance information is judged. Thus, the region segmentation on the entire images becomes unnecessary, so that the amount of processing can be decreased.

Figure 12:
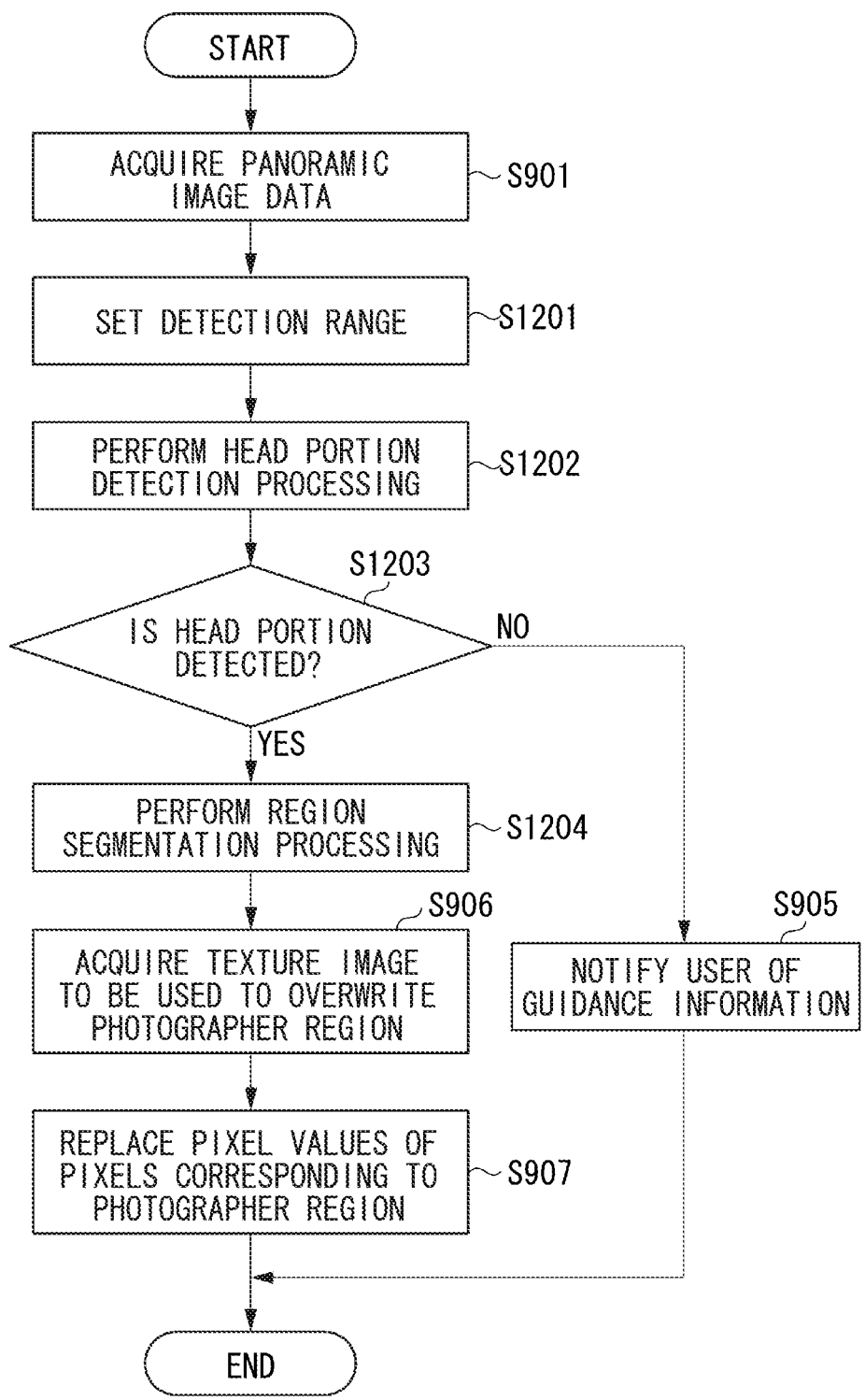
FIG. 12 is a flowchart illustrating a process to be performed by the image processing unit according to the second exemplary embodiment.

The following describes processing to be performed by the image processing unit 210 according to the present exemplary embodiment, with reference to FIGS. 11 and 12. The CPU 201 executes a program stored in the ROM 203 to control the image processing unit 210 as respective blocks illustrated in FIG. 11, whereby the image capturing apparatus 100 according to the present exemplary embodiment executes processing illustrated in the flowchart in FIG. 12. Not the entire processing described below has to be executed by the image processing unit 210, and the image capturing apparatus 100 may be configured such that one or multiple processing circuits other than the image processing unit 210 execute a part of or the entire processing. Steps that are similar to those in the first exemplary embodiment are given the same reference numbers as those in FIGS. 8 and 9, and description of the steps is omitted.

In step S1201, a detection unit 1101 sets a range of an image region on which the detection of the head part is to be performed. In FIG. 13, a frame 1301 specifies a head part detection range. While the size of the detection range can arbitrarily be set, a more appropriate detection range can be set by inputting in advance information about bodily shapes of the photographer such as the height and weight of the photographer, and then by inversely calculating, based on the input information, a region where the head part is likely to be located, whereby the detection range is determined more properly.

In step S1202, the detection unit 1101 performs the head part detection processing to detect the head part of the photographer in the detection range set in step S1201. Various types of publicly-known processing can be used to detect the head part. For example, in the present exemplary embodiment, a method is used in which multiple head part patterns of different ages, races, hair colors, etc. are stored in advance in a database, and pattern matching with the head part patterns is performed within the detection range. To further decrease the amount of processing, a method may be used in which simply a circular region having a color such as black, brown, gray, etc. is extracted. Further, the head part detection may be performed by use of a circuit for the head part detection that has performed learning in advance by use of multiple head part patterns. The detection unit 1101 outputs a result of the head part detection processing to the judgment unit 803.

In step S1203, the judgment unit 803 judges whether the image is an image suitable for the photographer elimination. If the head part is detected in the detection range (YES in step S1203), the judgment unit 803 judges that the image is an image suitable for the photographer elimination, and the processing proceeds to step S1204. On the other hand, if no head part is detected in the detection range (NO in step S1203), the judgment unit 803 judges that the image is not an image suitable for the photographer elimination, and the processing proceeds to step S905.

In step S1204, a segmentation unit 1102 performs the region segmentation processing on the acquired panoramic image, and the processing proceeds to step S906. The region segmentation processing performed in step S1204 is similar to the processing performed in step S902.

The foregoing describes the processing to be performed by the image capturing apparatus 100 according to the present exemplary embodiment. The foregoing processing enables simplification of the processing for the judgment of whether a panoramic image is suitable for the photographer elimination. Thus, the judgment of whether a panoramic image is suitable for the photographer elimination can be performed by a smaller amount of processing than that in the first exemplary embodiment. A feature of the photographer to be detected in the processing does not have to be the head part. For example, an arm extending from the image capturing apparatus may be detected, and if the length of the arm is long, it may be judged that the image is not suitable for the photographer elimination. The processing is easier, however, in the case of detecting the head part. In the present exemplary embodiment, the detection unit 1101 functions as a detection unit configured to detect a feature amount specifying a head part in a predetermined region in the captured images or the generated image.

In the second exemplary embodiment, the example is described in which if the head part of the photographer is detected in the small region in the central part of the image, it is judged that the panoramic image is an image suitable for the photographer elimination. However, in a case where, for example, the photographer is standing on a boundary of different ground regions while performing the image capturing as illustrated in FIG. 14A, even if the photographer holds the image capturing apparatus 100 high above the head of the photographer while capturing images, a deformation occurs in the ground region as illustrated in FIG. 14B when the photographer elimination processing is performed. In a third exemplary embodiment, a technical solution will be described in which the photographer is notified of guidance information prompting the photographer to move.

Figure 15:
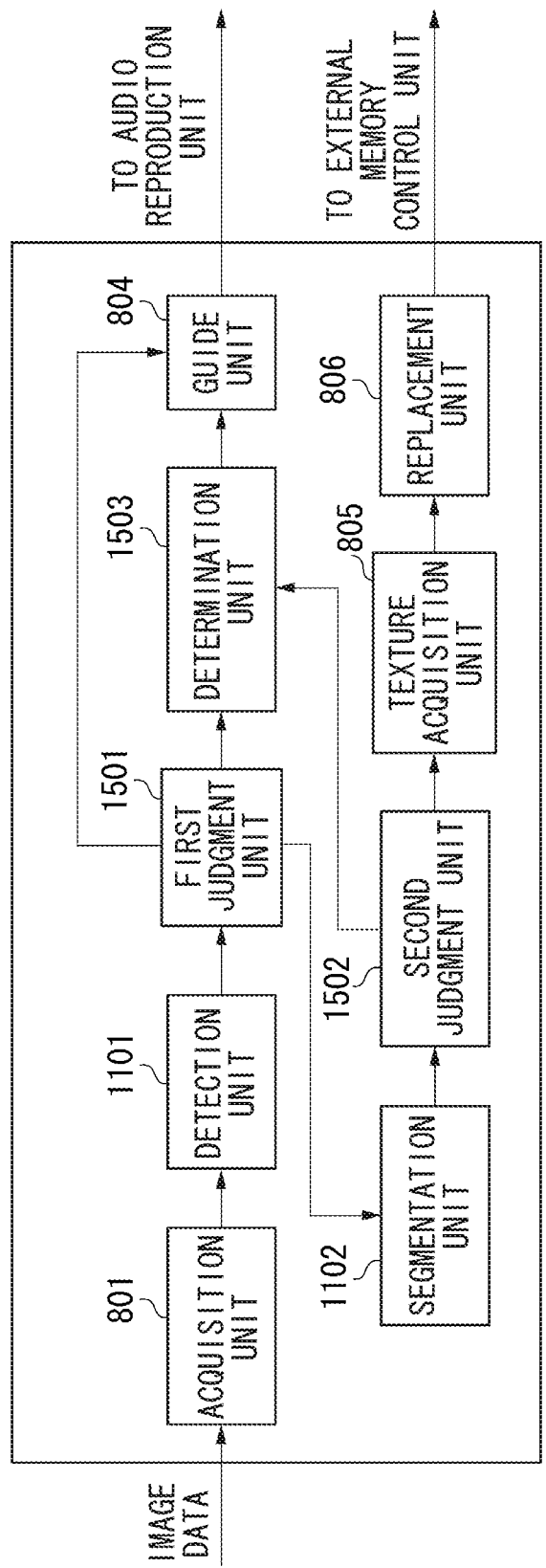
FIG. 15 is a block diagram illustrating a configuration of an image processing unit according to the third exemplary embodiment.
Figure 16:
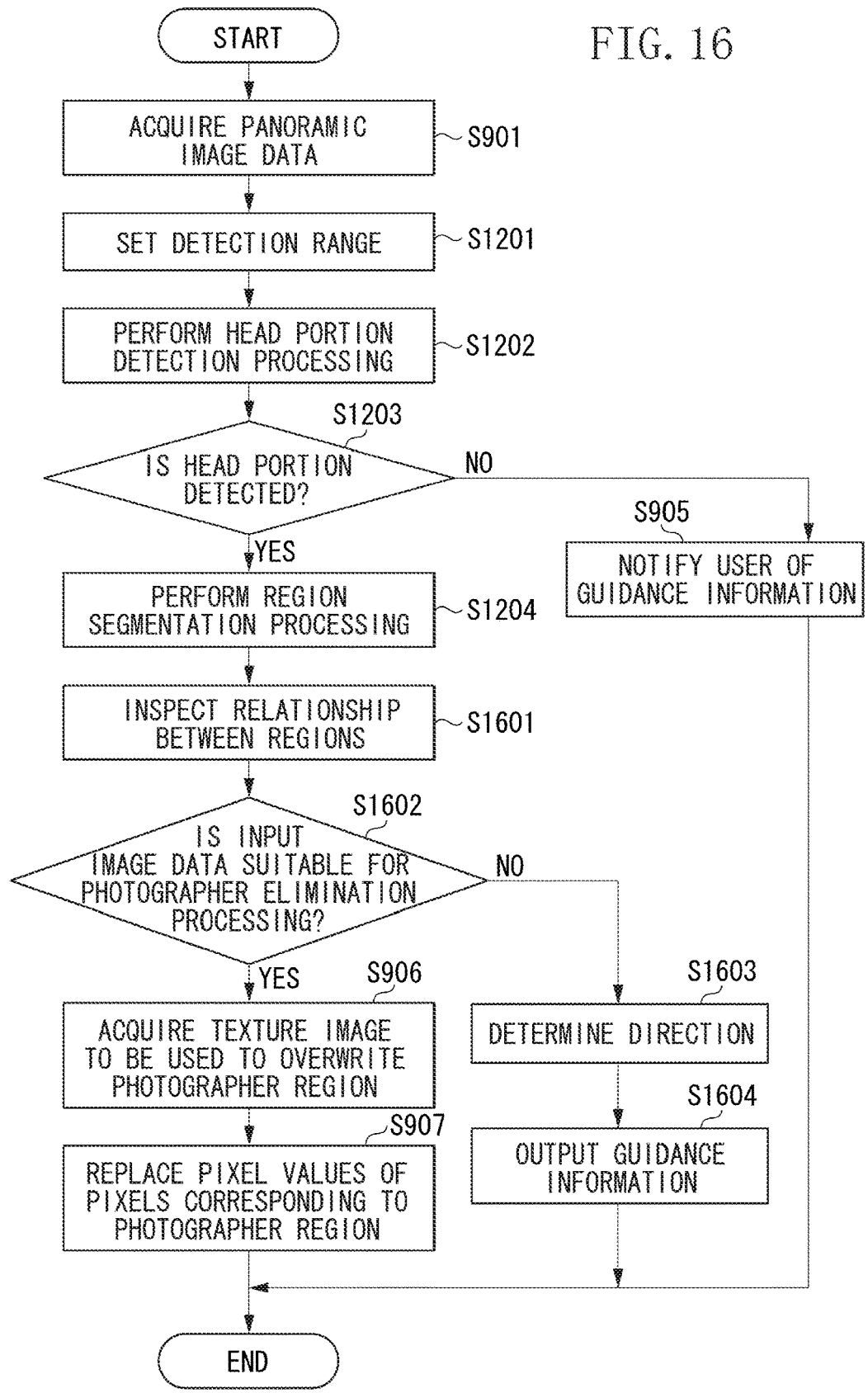
FIG. 16 is a flowchart illustrating a process to be performed by the image processing unit according to the third exemplary embodiment.

The following describes processing to be performed by the image processing unit 210 of the present exemplary embodiment, with reference to FIGS. 15 and 16. The CPU 201 executes a program stored in the ROM 203 to control the image processing unit 210 as respective blocks illustrated in FIG. 15, whereby the image capturing apparatus 100 according to the present exemplary embodiment executes processing illustrated in the flowchart in FIG. 16. Not the entire processing described below has to be executed by the image processing unit 210, and the image capturing apparatus 100 may be configured such that one or multiple processing circuits other than the image processing unit 210 execute a part of or the entire processing. Steps that are the same as those in the first and second exemplary embodiments are given the same reference number as those in FIGS. 8, 9, 11, and 12, and description of the steps is omitted.

In FIG. 15, although a first judgment unit 1501 is given a new component name in relation to a second judgment unit 1502 described below, the configuration of the first judgment unit 1501 is similar to the configuration of the judgment unit 803 according to the second exemplary embodiment, and is a unit configured to perform the head part detection processing in step S1203.

In step S1601, the second judgment unit 1502 inspects the relationship between the photographer region and the ground region based on the region segmented data input from the segmentation unit 1102. The processing performed in step S1601 is similar to the processing performed in step S903 in the first exemplary embodiment.

In step S1602, the second judgment unit 1502 judges whether the input panoramic image data is an image suitable for the photographer elimination processing based on a result of the inspection performed in step S1601. The judgment criteria are similar to those used in step S904 in the first exemplary embodiment. If the second judgment unit 1502 judges that the input panoramic image data is an image suitable for the photographer elimination processing (YES in step S1602), the processing proceeds to step S906. On the other hand, if the second judgment unit 1502 judges that the input panoramic image data is not an image suitable for the photographer elimination processing (NO in step S1602), the processing proceeds to step S1603.

In step S1603, a determination unit 1503 determines a direction in which the photographer is to move to perform the image capturing again. To perform the image capturing again, it is desirable to move to a direction in which the ground region extends widely. Thus, the determination unit 1503 calculates the center of gravity of pixel positions of all the pixels included in the ground region that has the largest area (the number of corresponding pixels) among the regions judged as the ground regions, and determines a direction based on the coordinate of the center of gravity. Specifically, if the center of gravity of pixel positions of all the pixels included in the ground region that has the largest area exists on the right viewed from the photographer, the right is determined as the direction in which the photographer is to move. The determination unit 1503 outputs to the guide unit 804 information indicating the determined direction.

In step S1604, the guide unit 804 outputs guidance information to the audio reproduction unit 212 based on the direction input from the determination unit 1503, and the processing ends. In the present exemplary embodiment, if the direction input from the determination unit 1503 is the right, guidance information is output so that audio such as "Please move to the right and re-shoot" can be reproduced by the audio reproduction unit 212. Notification of the guidance information does not have to be by audio. The image capturing apparatus 100 may include a display, and the guidance information may be displayed on the display to notify the user of the guidance information. However, in the case where notification of the guidance information is made by audio, the user can recognize the guidance information even when the user is holding the image capturing apparatus 100 above the head of the user. Thus, notification by audio is more desirable.

The foregoing describes the processing performed by the image capturing apparatus 100 according to the present exemplary embodiment. By the foregoing processing, even when a panoramic image suitable for the photographer elimination cannot be acquired by capturing images while holding the image capturing apparatus above the head, the user can be notified of information for correcting the position of the image capturing apparatus so that a panoramic image suitable for the photographer elimination can be acquired. In the present exemplary embodiment, the determination unit 1503 functions as a direction determination unit configured to determine a direction in which the image capturing apparatus is to move based on the position of the ground region in a case where it is judged that an image of the support member does not exist in the predetermined range.

Figure 17:
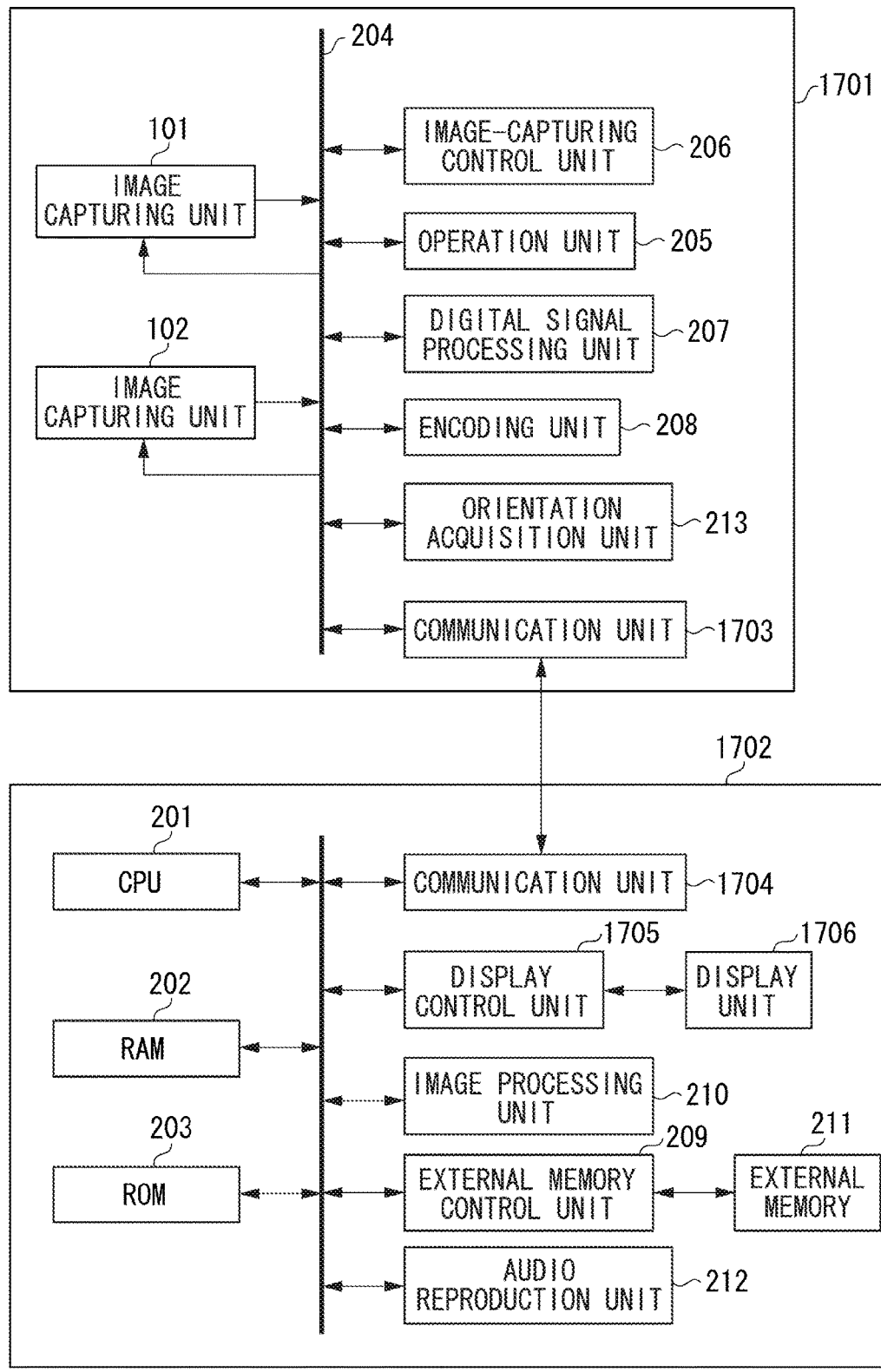
FIG. 17 is a block diagram illustrating an image capturing system according to an exemplary embodiment.

The foregoing exemplary embodiments are not intended to limit the scope of exemplary embodiments of the present invention, and various other exemplary embodiments are possible. For example, an exemplary embodiment of the present invention is applicable to an image capturing system in which an image capturing apparatus and an image processing apparatus are connected as illustrated in FIG. 17. In FIG. 17, an image capturing apparatus 1701 and an image processing apparatus 1702 are connected to each other via communication units 1703 and 1704. The image capturing apparatus 1701 and the image processing apparatus 1702 have a configuration that the components of the image capturing apparatus 100 are distributed to the image capturing apparatus 1701 and the image processing apparatus 1702, and major image processing is performed by the image processing apparatus 1702. The communication units 1703 and 1704 are wireless communication modules and establish a wireless connection such as Wireless Fidelity (Wi-Fi) connection and Bluetooth connection between the image capturing apparatus 1701 and the image processing apparatus 1702. The image capturing apparatus 1701 outputs the acquired image data to the image processing apparatus 1702 via the communication unit 1703, and the image processing apparatus 1702 performs processing on the image data received via the communication unit 1704. The image capturing apparatus 1701 and the image processing apparatus 1702 do not necessarily have to be connected by wireless communication and may be connected by wired communication such as a local area network (LAN) connection and USB connection. The image processing apparatus 1702 includes a display unit 1706, which is a display configured to display images, characters, etc. and a display control unit 1705, which is a control circuit configured to control the display unit 1706. In this configuration, as a method of notifying the user of guidance information, not only the reproduction of audio but also the display of characters and/or images on the display unit 1706 may be performed.

Figure 18:
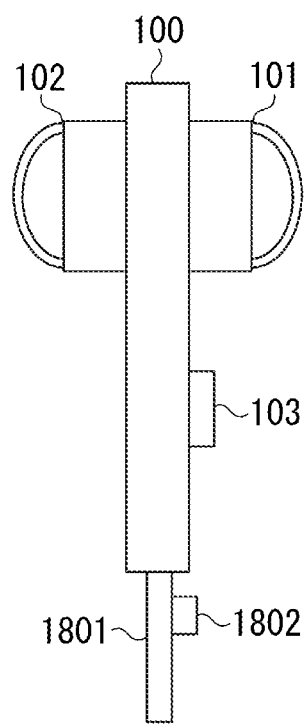
FIG. 18 illustrates a modification example of a panoramic image capturing apparatus.

Further, the image capturing apparatus 100 may include a grip 1801 as illustrated in FIG. 18 so that the user can hold the image capturing apparatus 100 high above the head. The grip 1801 includes an image-capturing button 1802, and a mode for the photographer elimination may be set to be executed when an image capture instruction is input by use of the image-capturing button 1802.

An exemplary embodiment of the present invention can provide assistance in capturing an image suitable for eliminating an image of the photographer included in an image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242456, filed Nov. 28, 2014, which is hereby incorporated by reference herein in its entirety.

What is claimed is:

1. An image processing apparatus configured to process captured images captured by an image capturing apparatus configured to simultaneously capture a plurality of images for generating a panoramic image or a generated image generated from the captured images, the image processing apparatus comprising:
   a judgment unit configured to judge whether or not to perform an elimination process, which is to eliminate a region corresponding a support member supporting the image capturing apparatus, for the captured images or the generated image based on determining whether the region corresponding the support member is surrounded by a single region or by two or more different regions in the captured images or the generated image;
   a notification unit configured to notify, in a case where the judgment unit determines that the region corresponding to the support member is surrounded by two or more different regions, a user of guidance information for changing a viewpoint position from which the image capturing apparatus captures images without performing the elimination process for the captured images or the generated image; and
   a replacement unit configured to, in a case where the judgment unit judges that the region corresponding to the support member is surrounded by the single region, perform the elimination process by replacing the region corresponding the support member with texture in the single region surrounding the region corresponding the support member.

2. The image processing apparatus according to claim 1, further comprising a detection unit configured to detect a feature amount indicating a head part in a predetermined region in the captured images or the generated image,
   wherein in a case where the feature amount indicating the head part is detected in the predetermined region in the captured images or the generated image, the judgment unit judges that the region corresponding to the image of the support member is surrounded by the single region.

3. The image processing apparatus according to claim 2, wherein a size of the predetermined region is determined based on information specifying a bodily shape of a person having the head part.

4. The image processing apparatus according to claim 1, wherein the notification unit notifies the user of the guidance information by reproducing guidance audio for correcting a position from which the image capturing apparatus captures images.

5. The image processing apparatus according to claim 1, further comprising a display unit configured to display the guidance information,
   wherein the notification unit notifies the user of the guidance information by displaying on the display unit an image specifying the guidance information.

6. The image processing apparatus according to claim 1, wherein the support member is a person manipulating the image capturing apparatus.

7. An image processing apparatus configured to process captured images captured by an image capturing apparatus configured to simultaneously capture a plurality of images for generating a panoramic image or a generated image generated from the captured images, the image processing apparatus comprising:
- a region determination unit configured to determine a support member region corresponding to a support member supporting the image capturing apparatus and a ground region corresponding to a ground in the captured images or the generated image;
- a determination unit configured to determine, based on a relationship between the support member region and the ground region, whether the support member region is surrounded by two or more different types of ground region or by a single type of ground region in the captured images or the generated image;
- a judgment unit configured to judge whether or not to perform an elimination process, which is to eliminate the support member region for the captured images or the generated image based on a determination by the determination unit;
- a notification unit configured to notify, in a case where the judgment unit judges that the support member region is surrounded by two or more different types of ground region, a user of guidance information for changing a viewpoint position from which the image capturing apparatus captures images; and
- a replacement unit configured to, in a case where the judgment unit judges that the support member is surrounded by the single type of ground region, replace the support member region with texture in the single type of ground region.

8. The image processing apparatus according to claim 7, wherein in a case where an adjacent range of a first ground region having a widest adjacent range among the ground regions adjacent to the support member region, of which adjacent range is adjacent to the support member region, is wider by more than a predetermined threshold value than an adjacent range of a region different from the first ground region, of which adjacent range is adjacent to the support member region, the judgment unit judges that the support member region is surrounded by a single type of the ground region.

9. The image processing apparatus according to claim 7, wherein the region determination unit determines a ground region corresponding to a ground and a non-ground region not corresponding to a ground in the captured images or the generated image, and determines as the support member region the non-ground region that includes a point immediately below the image capturing apparatus.

10. The image processing apparatus according to claim 9, wherein the region determination unit expands the support member region by adding to the support member region the non-ground region adjacent to the support member region.

11. The image processing apparatus according to claim 7, further comprising a direction determination unit configured to determine a direction in which the image capturing apparatus is to be moved based on a position of the ground region in a case where the judgment unit judges that the region support member is surrounded by two or more different types of ground region,
wherein the notification unit notifies the user of the direction determined by the direction determination unit.

12. The image processing apparatus according to claim 11, wherein the direction determination unit determines a direction in which the image capturing apparatus is to be moved based on a position of a pixel of the ground region that has the largest area among the ground regions adjacent to the support member region.

13. The image processing apparatus according to claim 12, wherein the direction determination unit determines a direction in which a center of gravity of pixel positions of a plurality of pixels included in the ground region having the largest area among the ground regions adjacent to the support member region exists as the direction in which the image capturing apparatus is to be moved.

14. The image processing apparatus according to claim 7, wherein in a case where the judgment unit judges that a region corresponding to the support member does not exist in the predetermined range, the notification unit notifies the user of the guidance information.

15. The image processing apparatus according to claim 7, wherein the notification unit notifies the user of the guidance information by reproducing guidance audio for correcting a position from which the image capturing apparatus captures images.

16. The image processing apparatus according to claim 7, further comprising a display unit configured to display the guidance information,
wherein the notification unit notifies the user of the guidance information by displaying on the display unit an image specifying the guidance information.

17. The image processing apparatus according to claim 7, wherein the support member is a person manipulating the image capturing apparatus.

18. An image processing method of processing captured images captured by an image capturing apparatus configured to simultaneously capture a plurality of images for generating a panoramic image or a generated image generated from the captured images, the image processing method comprising:
- judging whether or not to perform an elimination process, which is to eliminate a region corresponding a support member supporting the image capturing apparatus, for the captured images or the generated image based on determining whether the region corresponding the support member is surrounded by a single region or by two or more different regions in the captured images or the generated image;
- notifying, in a case where the judging determines that the region corresponding to the support member is surrounded by two or more different regions, a user of guidance information for changing a viewpoint position from which the image capturing apparatus captures images without performing the elimination process for the captured images or the generated image; and
- performing the elimination process by replacing, in a case where the judging judges that the region corresponding to the support member is surrounded by the single region, the region corresponding the support member with texture in the single region surrounding the region corresponding the support member.

19. An image processing method of processing captured images captured by an image capturing apparatus configured to simultaneously capture a plurality of images for generating a panoramic image or a generated image generated from the captured images, the image processing method comprising:
- determining a support member region corresponding to a support member supporting the image capturing apparatus and a ground region corresponding to a ground in the captured images or the generated image;

determining, based on a relationship between the support member region and the ground region, whether the support member region is surrounded by two or more different types of ground region or by a single type of ground region in the captured images or the generated image;

judging whether or not to perform an elimination process which is to eliminate the support member region for the captured images or the generated image, based on the determining whether the support member region is surrounded by two or more different types of ground region or a single type of ground region in the captured images or the generated image;

notifying, in a case where the judging judges that the region support member is surrounded by two or more different types of ground region, a user of guidance information for changing a viewpoint position from which the image capturing apparatus captures images; and replacing, in a case where the judging judges that the support member is surrounded by the single type of ground region, the support member region with texture in the single type of ground region.

20. A non-transitory computer-readable storage medium storing a program which causes a computer or a plurality of computers to execute an image processing method of processing captured images captured by an image capturing apparatus configured to simultaneously capture a plurality of images for generating a panoramic image or a generated image generated from the captured images, the image processing method comprising:

judging whether or not to perform an elimination process, which is to eliminate a region corresponding a support member supporting the image capturing apparatus, for the captured images or the generated image based on determining whether the region corresponding the support member is surrounded by a single region or two or more different regions in the captured images or the generated image;

notifying, in a case where the judging determines that the region corresponding to the support member is surrounded by two or more different regions, a user of guidance information for changing a viewpoint position from which the image capturing apparatus captures images without performing the elimination process for the captured images or the generated image; and performing the elimination process by replacing, in a case where the judging judges that the region corresponding to the support member is surrounded by the single region, the region corresponding the support member with texture in the single region surrounding the region corresponding the support member.

21. A non-transitory computer-readable storage medium storing a program which causes a computer or a plurality of computers to execute an image processing method of processing captured images captured by an image capturing apparatus configured to simultaneously capture a plurality of images for generating a panoramic image or a generated image generated from the captured images, the image processing method comprising:

determining a support member region corresponding to a support member supporting the image capturing apparatus and a ground region corresponding to a ground in the captured images or the generated image;

determining, based on a relationship between the support member region and the ground region, whether the support member region is surrounded by two or more different types of ground region or by a single type of ground region in the captured images or the generated image;

judging whether or not to perform an elimination process which is to eliminate the support member region for the captured images or the generated image, based on the determining whether the support member region is surrounded by two or more different types of ground region or a single type of ground region in the captured images or the generated image;

notifying, in a case where the judging judges that the region support member is surrounded by two or more different types of ground region, a user of guidance information for changing a viewpoint position from which the image capturing apparatus captures images; and replacing, in a case where the judging judges that the support member is surrounded by the single type of ground region, the support member region with texture in the single type of ground region.

22. The image processing apparatus according to claim 1, wherein, in the captured images or the generated image, each of a region corresponding to a ground and the region corresponding to the image of the support member is determined, and region segmentation data is outputted, and wherein the judgment unit performs the judgment on a basis of the region segmentation data.

23. The image processing apparatus according to claim 22, wherein the judgment unit extracts an edge of the region corresponding to the support member in the region segmentation data and counts, for each type, regions corresponding to pixels adjacent to a pixel extracted as the edge.

24. The image processing apparatus according to claim 23, wherein it is judged whether a ratio of frequency of detection of other types of region with respect to a region with highest detection frequency among the pixels adjacent to the pixel extracted as the edge is higher than a predetermined threshold value or not.

* * * * *